United States Patent [19]

Warzelhan et al.

[11] Patent Number: 4,705,835

[45] Date of Patent: Nov. 10, 1987

[54] PREPARATION OF HOMOPOLYMERS AND COPOLYMERS OF α-MONOLEFINS USING A ZIEGLER CATALYST SYSTEM

[75] Inventors: Volker Warzelhan, Weisenheim; Robert Bachl, Worms; Wolfgang Ball, Mannheim; Guido Funk, Weisenheim; Martin Laun, Ludwigshafen, all of Fed. Rep. of Germany

[73] Assignee: BASF Aktiengesellschaft, Fed. Rep. of Germany

[21] Appl. No.: 876,298

[22] Filed: Jun. 18, 1986

Related U.S. Application Data

[63] Continuation of Ser. No. 666,475, Oct. 30, 1984, abandoned.

[30] Foreign Application Priority Data

Feb. 10, 1984 [DE] Fed. Rep. of Germany ....... 3404668

[51] Int. Cl.$^4$ .......................... C08F 4/64; C08F 10/02
[52] U.S. Cl. .................................... 526/116; 502/113; 526/114; 526/129; 526/348.6
[58] Field of Search ................................ 526/114, 116

[56] References Cited

U.S. PATENT DOCUMENTS

| | | | |
|---|---|---|---|
| 4,098,979 | 7/1978 | Maemoto et al. | 526/142 |
| 4,151,337 | 4/1979 | Kanoh et al. | 526/116 |
| 4,508,842 | 4/1985 | Beran et al. | 526/142 |

FOREIGN PATENT DOCUMENTS

| | | | |
|---|---|---|---|
| 716176 | 8/1965 | Canada | 526/169.2 |
| 3242150 | 5/1984 | Fed. Rep. of Germany | |
| 1601418 | 10/1981 | United Kingdom | |

Primary Examiner—Edward J. Smith
Attorney, Agent, or Firm—Keil & Weinkauf

[57] ABSTRACT

α-Monoolefins are polymerized using a Ziegler catalyst system comprising (1) a transition metal catalyst component and (2) an organoaluminum catalyst component, in which (1) is a solid-phase product (VI) obtained by (1.1) first combining (1.1.1) an inorganic oxidic substance (I), as the carrier, with (1.1.2) a solution (II) consisting of (IIa) an organic solvent and (IIb) a transition metal composition to form a suspension (III), evaporating down this suspension to form a solid-phase intermediate (IV), and (1.2) then (1.2.1) combining the solid-phase intermediate (IV), obtained from (1.1), with (1.2.2) a solution of an organoaluminum compound (V) to form a suspension, the resulting suspended solid-phase product (VI) being the transition metal catalyst component (1). The characteristic feature is that (1) is a solid-phase product (VI) obtained using a solution (II) consisting of (IIa) a certain oxahydrocarbon and (IIb) a mixture of (IIb1) a vanadium trichloride/alcohol complex, (IIb2) a titanium trihalide and (IIb3) a zirconium tetrahalide.

2 Claims, No Drawings

PREPARATION OF HOMOPOLYMERS AND COPOLYMERS OF α-MONOLEFINS USING A ZIEGLER CATALYST SYSTEM

This application is a continuation of application Ser. No. 666,475 filed on Oct. 30, 1984, now abandoned.

The present invention relates to a process for the preparation of homopolymers and copolymers of $C_2$–$C_8$-α-monoolefins, in particular of ethylene, by polymerization of the monomer or monomers at from 30° to 200° C., in particular from 50° to 125° C., and under a pressure of from 0.1 to 200, in particular from 5 to 60, bar, using a Ziegler catalyst system comprising (1) a transition metal catalyst component and
(2) an organoaluminum catalyst component of the formula

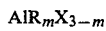
$$AlR_mX_{3-m}$$

where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is a number from 1 to 3, preferably 2 or 3, with the provisos (i) that the atomic ratio of the transition metal from the catalyst component (1) to aluminum from component (2) is from 1:0.1 to 1:500, preferably from 1:0.2 to 1:200, and (ii) that the transition metal catalyst component (1) used is a solidphase product (VI), obtained by a method in which (1.1) first
(1.1.1) a finely divided, porous, inorganic oxidic substance (I), which has a particle diameter of from 1 to 1,000, preferably from 1 to 400, μm, a pore volume of from 0.3 to 3, preferably from 1 to 2.5, cm³/g and a specific surface area of from 100 to 1,000, preferably from 200 to 400, m²/g and is of the formula $SiO_2 \cdot aAl_2O_3$ where a is a number from 0 to 2, in particular from 0 to 0.5, and (1.1.2) a solution (II), as obtained on combining (IIa) 100 parts by weight of an organic solvent and
(IIb) from 0.01 to 50, preferably from 1 to 30, parts by weight of a transition metal composition, are brought into contact with one another to form a suspension (III), with the proviso that the weight ratio of inorganic oxidic substance (I) to transition metal composition (IIb) is from 1:0.01 to 1:2, preferably from 1:0.2 to 1:1.5, the suspension (III) is evaporated to dryness at below 200° C., preferably below 160° C., and above the melting point of the organic solvent (IIa) used, a solidphase intermediate (IV) being formed, and (1.2) thereafter
(1.2.1) the solid-phase intermediate (IV) obtained from stage (1.1) and
(1.2.2) a solution, in an organic solvent, of an aluminum compound (V) of the formula

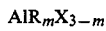
$$AlR_mX_{3-m}$$

where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is a number from 1 to 3, preferably 2, are brought into contact with one another to form a suspension, with the proviso that the weight ratio of the solid-phase intermediate (IV) to the aluminum compound (V) is from 1:0.05 to 1:2, preferably from 1:0.1 to 1:1, and the resulting suspended solid-phase product (VI) is the transition metal catalyst component (1).

Polymerization processes of this type are known, and the process described in British Pat. No. 1,601,418 may be considered to be representative in the present case.

The central feature of the stated method, as in other parallel methods, is the special embodiment of transition metal catalyst component (1).

It is known that special embodiments of the transition metal catalyst component are produced in order to achieve certain aims, such as the following:

(a) catalyst systems which are capable of giving a high yield of polymer, ie. catalyst systems with a high productivity, i.e. systems in which the amount of polymer formed by unit weight of the catalyst component (1) is increased.

(b) Catalyst systems which introduce less halogen, if any, into the polymer; this can be achieved by (b₁) increasing the yield as described in (a) and/or
(b₂) using transition metal catalyst components which contain very little or no halogen.

(c) Catalyst systems which display their advantageous actions even at relatively low temperatures; this may be important, for example, for dry-phase polymerization.

(d) Catalyst systems which influence the morphological properties of the polymers in a certain way, for example giving uniform particle size, a small fraction of very fine particles and/or a high bulk density; this may be important with regard to mastering the polymerization systems technically and working up the polymers and/or for the processability of the polymers.

(e) Catalyst systems which can be simply and reliably prepared and are easy to handle, for example those which can be prepared in an inert hydrocarbon medium.

(f) Catalyst systems which make it possible to manage with a relatively small amount of regulator in polymerizations in the presence of molecular weight regulators, such as hydrogen; this may be important, for example, for the thermodynamics of the procedure.

(g) Catalyst systems which permit the production of polymers having particularly pronounced stress cracking resistance, a property which is particularly important, for example, for liquid containers, especially containers in which corrosive liquids are to be stored.

(h) Catalyst systems tailored to special polymerization processes, for example those which are adapted to the specific features of either suspension polymerization or dry-phase polymerization.

(i) Catalyst systems giving polymers which on the one hand have a high molecular weight (strong finished product) and on the other hand can be processed without problems, i.e. high molecular weight polymers which can be relatively rapidly processed to give satisfactorily shaped articles, even when relatively low processing temperatures and/or relatively weak processing forces are used.

(j) Catalyst systems which give polymers having particularly high rigidity; this property is desirable for many fields of use.

From experience to date, there are, among the various aims, some which can be achieved by means of particular embodiments of the transition metal catalyst component only if other aims are neglected.

Under these circumstances, it is generally desirable to find embodiments which not only allow the selected aims to be achieved but also result in other desirable aims being neglected as little as possible.

It is an object of the present invention to provide a novel type of transition metal catalyst component, by means of which, with similar aims, better results can be achieved compared with conventional transition metal catalyst components, particularly with regard to the abovementioned aims (d) and (g), which should be achieved to a very high degree while at the same time aims (i) and (j) are achieved satisfactorily and aim (a) is neglected as little as possible.

We have found that this object is achieved by means of a transition metal catalyst component (1) of the type described at the outset, which is prepared using a solution (II) which consists of (i) a special organic solvent in which (ii) the three transition metals vanadium, titanium and zirconium are present together in a certain manner.

The present invention accordingly relates to a process for the preparation of homopolymers and copolymers of $C_2$-$C_8$-α-monoolefins, in particular of ethylene, by polymerization of the monomer or monomers at from 30° to 200° C., in particular from 50° to 125° C., and under a pressure of from 0.1 to 200, in particular from 5 to 60, bar, using a Ziegler catalyst system comprising (1) a transition metal catalyst component and
(2) an organoaluminum catalyst component of the formula $$AlR_mX_{3-m}$$

where X is a radical OR, chlorine, bromine or hydrogen, preferably a radical OR or chlorine, R is a $C_1$-$C_{18}$-hydrocarbon radical, in particular $C_1$-$C_{12}$-alkyl, preferably $C_2$-$C_8$-alkyl, and m is a number from 1 to 3, preferably 2 or 3, with the provisos (i) that the atomic ratio of the transition metal from the catalyst component (1) to aluminum from catalyst component (2) is from 1:0.1 to 1:500, preferably from 1:0.2 to 1:200, and (ii) that the transition metal catalyst component (1) is a solidphase product (VI), obtained by a method in which (1.1) first
(1.1.1) a finely divided, porous, inorganic oxidic substance (I), which has a particle diameter of from 1 to 1,000, preferably from 1 to 400, μm, a pore volume of from 0.3 to 3, preferably from 1 to 2.5, cm³/g and a specific surface area of from 100 to 1,000, preferably from 200 to 400, m²/g and is of the formula $SiO_2.aAl_2O_3$ where a is a number from 0 to 2, in particular from 0 to 0.5, and (1.1.2) a solution (II), as obtained on combining (IIa) 100 parts by weight of an organic solvent and
(IIb) from 0.01 to 50, preferably from 1 to 30, parts by weight of a transition metal composition, are brought into contact with one another to form a suspension (III), with the proviso that the weight ratio of inorganic oxidic substance (I) to transition metal composition (IIb) is from 1:0.01 to 1:2, preferably from 1:0.2 to 1:1.5, the suspension (III) is evaporated to dryness at below 200° C., preferably below 160° C., and above the melting point of the organic solvent (IIa) used, a solid-phase intermediate (IV) being formed, and (1.2) thereafter
(1.2.1) the solid-phase intermediate (IV) obtained from stage (1.1) and (1.2.2) a solution, in an organic solvent, of an aluminum compound (V) of the formula $$AlR_mX_{3-m}$$

where X is a radical OR, chlorine, bromine or hydrogen, preferably a radical OR or chlorine, R is a $C_1$-$C_{18}$-hydrocarbon radical, in particular $C_1$-$C_{12}$-alkyl, preferably $C_2$-$C_8$-alkyl, and m is a number from 1 to 3, preferably 2, are brought into contact with one another to form a suspension, with the proviso that the weight ratio of the solid-phase intermediate (IV) to the aluminum compound (V) is from 1:0.05 to 1:2, preferably from 1:0.1 to 1:1, and the resulting suspended solid-phase product (VI) is the transition metal catalyst component (1).

In the novel process, the transition metal catalyst component (1) employed is a solid-phase product (VI) obtained using a solution (II) consisting of (IIa) a saturated aliphatic, or partially saturated aliphatic and partially aromatic, oxahydrocarbon of 1 or 2 oxa oxygen atoms, and 4 to 18 carbon atoms, preferably 1 oxa oxygen atom and 4 to 10 carbon atoms, in particular a saturated alicyclic oxahydrocarbon of 1 oxa oxygen atom and 4 to 6 carbon atoms, especially tetrahydrofuran, as the organic solvent, and (IIb) a mixture of (IIb1) 100 molar parts of a vanadium trihalide/ alcohol complex of the formula $VY_3.nZ$-OH, where Y is chlorine or bromine, preferably chlorine, n is from 1 to 6, preferably 3 or 4, and Z is a monovalent saturated aliphatic, or partially saturated aliphatic and partially aromatic, hydrocarbon radical of not more than 10, preferably not more than 8, carbon atoms, in particular alkyl of not more than 4 carbon atoms, (IIb2) from 0.2 to 300, preferably from 0.5 to 100, molar parts of a titanium trihalide in which the halogen can be chlorine and/or bromine, preferably of a titanium trichloride and (IIb3) from 1 to 400, preferably from 3 to 200, molar parts of a zirconium tetrahalide in which the halogen can be chlorine and/or bromine, preferably of a zirconium tetrachloride as the transition metal composition.

Regarding the novel process, the following may be stated specifically:

Provided that the characteristic features are taken into account, the polymerization process as such can be carried out in virtually any relevant conventional technological embodiment, for example suspension polymerization, solution polymerization or dry-phase polymerization by a batchwise, semi-continuous or continuous procedure. The technological embodiments mentioned, i.e. the technological variants of the Ziegler polymerization of olefins, are well known from the literature and in practice, so that a more detailed description of these is unnecessary here. However, it should be stated that the novel transition metal catalyst component (1), like corresponding conventional catalyst components, can, for example, be combined with the catalyst component (2) either outside or inside the polymerization vessel, in the latter case, for example, by introducing the components at separate points; the components are otherwise handled in the form of a suspension (catalyst component (1)) or of a solution (catalyst component (2)). It is also possible, for example, to employ catalyst component (1), or the combined catalyst components (1) and (2), in the form of particles which are provided with a wax covering; this method may be advantageous in the dry-phase polymerization process.

Regarding the novel transition metal catalyst component (1) itself, the following may be stated:

It is prepared in two stages which are denoted by (1.1) and (1.2) above and below.

In stage (1.1) a finely divided inorganic oxidic substance (I) of the type defined above is brought into contact with a particular solution (II) defined above, and the resulting suspension (III) is evaporated to dryness (formation of a solid-phase intermediate (IV)). In stage (1.2), the latter is brought into contact with a solution of a particular aluminum compound (V) defined above, a suspension once again being formed; the resulting suspended solid-phase product (VI) is the novel catalyst component (1).

Specifically, the procedure is as follows:

Stage (1.1)

The inorganic oxidic substance (I) as such or suspended in an oxahydrocarbon (advantageously an oxahydrocarbon as defined under (IIa), the suspension containing not less than 5% by weight of solids) is combined with the solution (II), and the resulting suspension (III) is then evaporated down.

The preparation of solution (II) itself can be carried out in a conventional manner, and to this extent no special features are involved.

As a final measure in stage (1.1), the suspension (III) is evaporated to dryness, the solid-phase intermediate (IV) being obtained. This procedure can be carried out, while maintaining the above temperature conditions, by a conventional method for evaporating down suspensions under mild conditions. This means that it is generally advantageous (and may be absolutely necessary in the case of relatively high molecular weight oxahydrocarbons (IIa)) to carry out the evaporation under more or less greatly reduced pressure. As a general rule, the combination of temperature and pressure is chosen so that the evaporation process is complete after about 1–10 hours. It is also advantageous to carry out the evaporation while continuously keeping the treated material homogeneous; for example, rotary evaporators have proven useful for this purpose. A residual amount of oxahydrocarbon, for example an amount bound as a result of complex formation, generally does not have an adverse effect on the solid-phase intermediate (IV).

Stage (1.2)

First, a 0.1–50, preferably about 25, percent strength by weight suspension of the solid-phase intermediate (IV) and a 5–80, preferably about 20, percent strength by weight solution of the aluminum compound (V) are prepared separately, particularly suitable suspending agents or solvents being hydrocarbons, especially relatively low-boiling alkane hydrocarbons, eg. hexane, heptane or gasoline. The suspension and the solution are then combined in amounts such that the desired weight ratio is obtained. This combination is generally carried out by introducing the solution into the stirred suspension, since this procedure is more practical than the converse one, which is also possible. At from $-25°$ to $120°$ C., in particular from $25°$ to $80°$ C., formation of the solid-phase product (VI), which is present in suspension, is complete within from 15 to 600, in particular from 60 to 300, minutes. This product, advantageously directly in the form of the resulting suspension and, if necessary, after being washed by digestion or filtration, can be used as the transition metal catalyst component (1). If desired, however, it is also possible first to isolate the solid-phase product (VI) and then to use it as catalyst component (1); isolation can be effected, for example, by the following method: the product (VI) is separated from the liquid phase by filtration, is washed with pure liquid (for example of the type also used as the suspending agent or solvent) and is then dried, for example under reduced pressure.

The novel transition metal catalysts (1), i.e. the solid-phase products (VI), can be employed in the process, defined at the outset, for the preparation of the polymers mentioned there, the procedure used being a conventional one for transition metal catalyst components in the Ziegler polymerization of α-monoolefins. To this extent, therefore, the novel process does not involve any special features, and reference may be made to the methods of use which are well known from the literature and in practice. It should merely be stated that the process is mainly suitable for the preparation of homopolymers and copolymers of ethylene, and that, in the case of the preparation of copolymers of ethylene with higher α-monoolefins (or of the preparation of homopolymers and copolymers of higher α-monoolefins), particularly suitable α-monoolefins are but-1-ene and hex-1-ene. The molecular weights of the polymers can be regulated in a relevant conventional manner, in particular using hydrogen as a regulator.

Regarding the composition of the novel transition metal catalysts (1), the following may be stated specifically:

The inorganic oxidic substance (I) employed in stage (1.1) is generally an aluminosilicate or, in particular, a silicon dioxide; it is important that it possesses the properties required. We have found that the relevant conventional commercial carriers having the stated specification are very useful.

According to the invention, the solvent (IIa) employed is a saturated aliphatic, or partially saturated aliphatic and partially aromatic, oxahydrocarbon of 1 or 2 oxa oxygen atoms, and 4 to 18 carbon atoms, preferably 1 oxa oxygen atom and 4 to 10 carbon atoms, in particular a saturated alicyclic oxahydrocarbon of 1 oxa oxygen atom and 4 to 6 carbon atoms, especially tetrahydrofuran. Apart from the last-mentioned compound, examples of other suitable oxa-hydrocarbons are (taking into account the above order) ethylene glycol dimethyl ether, anisole, tetrahydropyran and dioxane. The oxahydrocarbons can be used in the form of individual compounds or as mixtures of two or more individual compounds.

The vanadium trihalide/alcohol complex (IIb1) employed is of the formula $VY_3.nZ\text{-}OH$, where Y is chlorine or bromine, preferably chlorine, n is from 1 to 6, preferably 3 or 4, and Z is a monovalent saturated aliphatic, or partially saturated aliphatic and partially aromatic, hydrocarbon radical of not more than 10, preferably not more than 8, carbon atoms, in particular alkyl of not more than 4 carbon atoms. Moreover, the vanadium trihalide starting material can be one which is conventionally used in Ziegler catalyst systems. Examples of suitable alcohol components (taking into account the abovementioned order) are methanol, ethanol, propan-2-ol, butan-2-ol and 2-methylbutan-2-ol. The complexes can be prepared by a conventional method, for example according to D. C. Bradley and M. L. Mehta, Can. J. Chem. 40 (1962), 1710–1713; these compounds too can be employed individually or as mixtures of two or more individual compounds.

The titanium trihalide (IIb2) used can also be one which is conventionally used in Ziegler catalyst systems, for example a product obtained in the reduction of a titanium tetrahalide by means of hydrogen, aluminum or an organoaluminum compound. Compounds which have been found to be particularly useful are, for example, trichlorides of the formula $TiCl_3$, as obtained in the reduction of titanium tetrachloride with hydrogen, and trichlorides of the formula $TiCl_3 \cdot \frac{1}{3}AlCl_3$, as obtained in the reduction of titanium tetrachloride by means of metallic aluminum. The titanium trihalides can be employed in the form of an individual compound or as mixtures of two or more individual compounds.

The zirconium tetrahalide (IIb3) used can likewise be one which is conventionally employed in Ziegler catalyst systems.

The aluminum compound (V) used in stage (1.2) can be, for example, a compound of the formula $Al(C_2H_5)_3$, $Al(C_2H_5)_2Cl$, $Al(C_2H_5)_2Br$, $Al(C_2H_5)_{1.5}Cl_{1.5}$, $Al(C_2H_5)_{1.5}Br_{1.5}$, $Al(C_2H_5)Cl_2$, $Al(C_2H_5)Br_2$, $Al(C_4H_9)_3$, $Al(C_4H_9)_2Cl$, $Al(C_4H_9)Cl_2$, $Al(C_2H_5)_2H$, $Al(C_4H_9)_2H$, $Al(C_3H_7)_2(OC_3H_7)$ or $Al(C_2H_5)_{1.5}(OC_2H_5)_{1.5}$, or isoprenyl-aluminum. We have found that aluminum compounds of the formulae $C_2H_5AlCl_2$ and $(C_2H_5)_2AlCl$, and isoprenyl-aluminum, are particularly useful. The aluminum compounds (V) can be employed in the form of individual compounds or as mixtures of two or more individual compounds.

Suitable organoaluminum catalyst components (2) are the relevant conventional compounds; examples of suitable individual compounds are those of the formulae $Al(C_2H_5)_3$, $Al(i-C_4H_9)_3$, $Al(n-C_4H_9)_3$ and $Al(C_8H_{17})_3$, and isoprenyl-aluminum.

Finally, it should furthermore be noted that the novel transition metal catalyst components (1), i.e. the products (VI), are sensitive to hydrolysis and oxidation. Hence, in handling these substances, the relevant conventional safety measures for Ziegler catalysts (e.g. absence of moisture, inert gas atmosphere) should be taken.

EXAMPLE 1

Preparation of the transition metal catalyst component (1):

Stage (1.1)

The starting materials used were (1.1.1) 25.3 parts by weight of silicon dioxide ($SiO_2$, particle diameter 90–150 μm, pore volume: 1.7 cm$^3$/g, specific surface area: 320 m$^2$/g) and (1.1.2) a solution of 100 parts by weight of tetrahydrofuran and 24 parts by weight of a transition metal composition consisting of 100 molar parts of a vanadium trihalide/alcohol complex of the formula $VCl_3 \cdot 4Z\text{-}OH$, where Z is isopropyl, 1.2 molar parts of a titanium trihalide of the formula $TiCl_3 \cdot \frac{1}{3}AlCl_3$ and 5.9 molar parts of zirconium tetrachloride. These two components were combined, and the resulting suspension was stirred for a short time. Thereafter, the solid-phase intermediate (IV) formed was isolated by stripping off the volatile constituents in a rotary evaporator brought to an operating pressure of 10 mbar and an operating temperature of 70° C.

Stage (1.2)

20 parts by weight of the solid-phase intermediate (IV) obtained in stage (1.1) were suspended in 103 parts by weight of n-heptane, a solution of 8 parts by weight of diethyl-aluminum chloride in 17 parts by weight of n-heptane was added to this suspension, and the resulting suspension was stirred for a short time at 65° C. The suspension was then filtered, and the residue was washed three times with n-heptane and dried under reduced pressure. Analysis of the resulting solid-phase product (VI), i.e. the catalyst component (1), showed that it contained 0.00145 mole of transition metals per g.

Polymerization 0.35 part by weight of the transition metal catalyst component (1) (corresponding to 1 molar part of transition metals) was suspended in 20.5 parts by weight of n-heptane. The resulting suspension was introduced into a stirred autoclave which was charged with 2,500 parts by weight (corresponding to about 50% of its capacity) of isobutane, 60 parts by weight of but-1-ene and 1.98 parts by weight of triisobutylaluminum (2) (corresponding to 20 molar parts). Polymerization was then carried out, while stirring, under the following conditions, which were kept constant by controlling them: ethylene pressure =23.5 bar, hydrogen pressure =1 bar and temperature =80° C. The polymerization was continued for 1.5 hours, after which it was terminated by letting down the pressure in the autoclave.

In this manner, an ethylene/but-1-ene/copolymer was obtained which had a high bulk density, a small proportion of very fine particles, high rigidity, good processability and high stress cracking resistance, the productivity being satisfactory.

EXAMPLE 2

Preparation of the transition metal catalyst component (1):

Stage (1.1)

The starting materials used were (1.1.1) 16.2 parts by weight of silicon dioxide ($SiO_2$, particle diameter 90–150 μm, pore volume: 1.7 cm$^3$/g, specific surface area: 320 m$^2$/g) and (1.1.2) a solution of 100 parts by weight of tetrahydrofuran and 13.3 parts by weight of a transition metal composition consisting of 100 molar parts of a vanadium trihalide/alcohol complex of the formula $VCl_3 \cdot 4Z\text{-}OH$, where Z is isopropyl, 1 molar part of a titanium trihalide of the formula $TiCl_3 \cdot \frac{1}{3}AlCl_3$ and 5 molar parts of zirconium tetrachloride. These two components were combined, and the resulting suspension was stirred for a short time. Thereafter, the solid-phase intermediate (IV) formed was isolated by stripping off the volatile constituents in a rotary evaporator brought to an operating pressure of 10 mbar and an operating temperature of 50° C.

Stage (1.2)

20 parts by weight of the solid-phase intermediate (IV) obtained in stage (1.1) were suspended in 103 parts by weight of n-heptane, a solution of 9.6 parts by weight of diethyl-aluminum chloride in 13.7 parts by weight of nheptane was added to this suspension, and the resulting suspension was stirred for a short time at 50° C. The suspension was then filtered, and the residue was washed three times with n-heptane and dried under reduced pressure. Analysis of the resulting solid-phase product (VI), i.e. the catalyst component (1), showed that it contained 0.00127 mole of the transition metals per g.

Polymerization 0.26 part by weight of the transition metal catalyst component (1) (corresponding to 1 molar part of transition metals) was suspended in 20.5 parts by weight of n-heptane. The resulting suspension was introduced into a stirred autoclave which was charged with 2,500 parts by weight (corresponding to about 50% of its capacity) of isobutane, 540 parts by weight of but-1-ene and 2.97 parts by weight of triisobutyl-aluminum (2) (corresponding to 45 molar parts). Polymerization was then carried out, while stirring, under the following conditions, which were kept constant by controlling them: ethylene pressure=24.2 bar, hydrogen pressure=0.3 bar and temperature=80° C. The polymerization was continued for 1.5 hours, after which it was terminated by letting down the pressure in the autoclave.

In this manner, a polymer was obtained which had a high bulk density, a small proportion of very fine particles, excellent stress cracking resistance, a good combination of rigidity and toughness, and outstanding processability to films, the productivity being satisfactory.

We claim:

1. A process for the preparation of copolymers of ethylene with $C_3$–$C_8$-α-monoolefins by polymerization of the monomers at from 50° to 125° C. and under a pressure of from 5 to 60 bar, using a Ziegler catalyst system comprising
   (1) a transition metal catalyst component and
   (2) an organoaluminum catalyst component of the formula $AlR_3$ where R is $C_2$–$C_8$-alkyl, with the provisos (i) that the atomic ratio of the transition metal from the catalyst component (1) to aluminum from catalyst component (2) is from 1:0.2 to 1:200 and (ii) that the transition metal catalyst component (1) is a solid-phase product (VI), obtained by a method in which
   (1.1) first
   (1.1.1) a finely divided, porous silicon dioxide (I), which has a particle diameter of from 1 to 400 μm, a pore volume of from 1 to 2.5 cm³/g and a specific surface area of from 200 to 400 m²/g and
   (1.1.2) a solution (II), as obtained on combining
   (IIa) 100 parts by weight of an organic solvent and
   (IIb) from 1 to 30 parts by weight of a transition metal composition, are brought into contact with one another to form a suspension (III), with the proviso that the weight ratio of silicon dioxide (I) to transition metal composition
   (IIb) is from 1:0.2 to 1:1.5, the suspension (III) is evaporated to dryness at below 160° C. and above the melting point of the organic solvent (IIa) used, a solid-phase intermediate (IV) being formed, and
   (1.2) thereafter
   (1.2.1) the solid-phase intermediate (IV) obtained from stage (1.1) and
   (1.2.2) a solution, in an organic solvent, of an aluminum compound (V) of the formula $AlR_mX_{3-m}$ where X is chlorine, R is $C_2$–$C_8$-alkyl, and m is the number 2, are brought into contact with one another to form a suspension, with the proviso that the weight ratio of the solid-phase intermediate (IV) to the aluminum compound (V) is from 1:0.1 to 1:1, and the resulting suspended solid-phase product (VI) is the transition metal catalyst component (1), the improvement which comprises employing as the transition metal catalyst component (1) a solid-phase product (VI) obtained using a solution (II) consisting of
   (IIa) a saturated alicylic oxahydrocarbon of 1 oxa oxygen atom and 4–6 carbon atoms as the organic solvent, and
   (IIb) a mixture of
   (IIb1) 100 molar parts of a vanadium trihalide/alcohol complex of the formula $VY_3.nZ\text{-}OH$, where Y is chlorine, n is from 1–6 and Z is an alkyl of not more than 4 carbon atoms,
   (IIb2) from 0.5 to 100 molar parts of a titanium trichloride and (IIb3) from 3 to 200 molar parts of a zirconium tetrachloride as the transition metal composition.

2. A process as defined in claim 1 wherein component (IIa) is tetrahydrofuran; and in component (IIb1) of the formula $VY_3.nZ\text{-}OH$ n is 3 or 4.

* * * * *